No. 611,201. Patented Sept. 20, 1898.
O. HORNER & W. H. WISE.
NUT LOCK.
(Application filed Mar. 23, 1898.)
(No Model.)
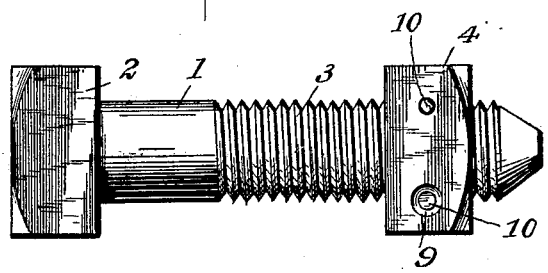
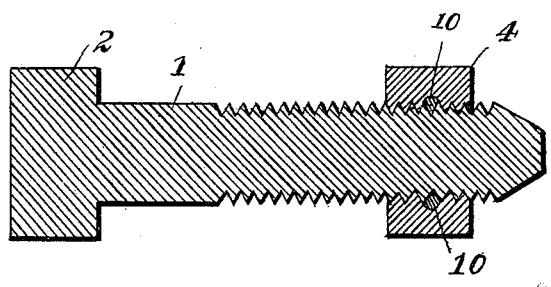
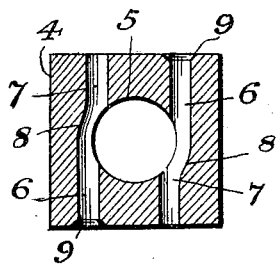
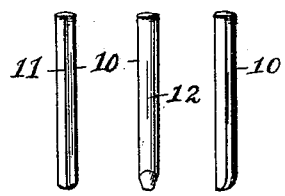
Witnesses
Saml R. Turner
Chas. S. Hyer
Inventors
Oscar Horner.
William H. Wise.
By R.H.A.K.Lacey,
Attorneys.

UNITED STATES PATENT OFFICE.

OSCAR HORNER AND WILLIAM H. WISE, OF DUBOIS, PENNSYLVANIA.

NUT-LOCK.

SPECIFICATION forming part of Letters Patent No. 611,201, dated September 20, 1898.

Application filed March 23, 1898. Serial No. 674,916. (No model.)

*To all whom it may concern:*

Be it known that we, OSCAR HORNER and WILLIAM H. WISE, citizens of the United States, residing at Dubois, in the county of Clearfield and State of Pennsylvania, have invented certain new and useful Improvements in Nut-Locks; and we do hereby declare the following to be a full, clear, and exact description of the invention, such as will enable others skilled in the art to which it appertains to make and use the same.

This invention relates to nut-locks; and it consists, essentially, of a threaded bolt on which the nut is rotatably mounted, having opposite openings extending therethrough provided with intermediate deflections in reverse positions and adapted to receive substantially triangular keys having sharpened edges engaging the threads of the bolt when applied and automatically secured in the nut when driven into the said openings.

The invention further consists of the details of construction of the several parts, which will be more fully hereinafter described and claimed.

In devices of this character as heretofore manufactured the threaded construction of the bolt has in many instances been materially injured by recesses or longitudinal grooves formed therein to receive transverse or longitudinal keys, dogs, or crushing-pins, either in part or wholly carried by a nut, and entailing considerable expense and expenditure of time in proportionately adjusting the said parts.

The object of the present invention is to simplify the formation of nut-locks by dispensing with all seats or grooves in the bolt-threads other than those afforded by the spaces between said threads and to obviate the necessity of cumbersome exterior locking devices on the nut and at the same time secure that degree of efficiency in operation and positive locking of the nut to resist accidental loosening of said nut by vibrations or impingement of extraneous devices or nearby parts aside from the ordinary tools or implements commonly employed for removing nuts.

In the accompanying drawings, Figure 1 is a side elevation of a bolt having a nut applied thereto and embodying the invention. Fig. 2 is a longitudinal vertical section of the arrangement of parts shown by Fig. 1. Fig. 3 is a detail view in transverse vertical section of the nut, showing the arrangement of the key-openings therein. Fig. 4 is a view showing the locking-keys in various positions.

Referring to the drawings, wherein similar numerals of reference are employed to indicate corresponding parts in the several views, the numeral 1 designates a bolt having at one end a head 2 and provided with the usual screw-threads 3, which may extend any distance thereover and be of any preferred pitch or degree of fineness. The nut 4 does not vary in external appearance from such devices as are used without locking attachments, and, as clearly illustrated by Fig. 3, has a central bolt-receiving opening 5, on opposite sides of which and communicating therewith are key-openings 6, extending entirely through the nut from one edge thereof to the other. The said openings 6 are deflected, as at 7, from a straight line by the interposition of curved walls 8, located at the outermost portion of the openings and reversely positioned in the opposite openings. The entrance end of each of the said openings 6 is reamed out, as at 9, for a purpose which will be presently set forth, and when the nut is applied to the bolt 1 the threads of the latter partially project into the said openings. The formation of the openings in the nut does not interfere with the threaded bolt-receiving opening 5, and before the said nut is locked it can be run backwardly and forwardly on the bolt, as may be desired, to exert the proper tension or binding action on the parts to be secured and with which the bolt is placed in engagement. After the nut has been screwed home far enough on the bolt keys 10 are driven into the opening 6, being inserted from opposite edges of the nut and preferably constructed of wrought or bendable metal, to thereby cause them to follow the deflections of said openings and become firmly secured against accidental displacement. Each of the keys is substantially triangular in cross-section and has an inner biting edge 11 and an outer curved surface 12. The said curved surface bears snugly against the outer rounded portion of the opening 6 and the biting edge takes into a space between the threads 3 of the bolt 1, as clearly shown in Fig. 2, and both of the keys are held snugly in contact with the bolt in the manner stated and against accidental movement by the deflected portions of the said openings 6.

The keys 10 bear upon the bolt at diametrically opposite points, and the deflections 7 of the openings 6, being reversely arranged, hold the said keys in their proper engaging positions and force them down and up, respectively, and thereby prevent the nut from being turned by any means whatsoever until the keys are released from the bolt and nut by being driven out of the latter with a punch or other analogous implement. The reamed-out ends 9 of the openings 6 permit the adjacent ends of the keys to be countersunk and shield them from contact with exterior objects.

The improved nut-lock is adapted for many uses, and it is intended that the same be employed wherever it is found applicable, and while the preferred form of construction has been fully disclosed it is obviously apparent that changes in the proportions, dimensions, and minor details of construction may be made and substituted for those shown and described without in the least departing from the nature or spirit of the invention or sacrificing any of the advantages thereof.

Having thus described the invention, what we claim as new is—

In a nut-lock, the combination of a bolt having continuous threads thereon, a nut movably mounted on said bolt and having openings extending through the body thereof from one edge to the other on opposite sides of a central bolt-opening and provided with reversely-situated deflections diagonally arranged relatively to said bolt-opening and merging into the latter, and substantially triangular keys driven into said openings from opposite sides and having biting edges to engage the spaces between the threads of the bolt.

In testimony whereof we affix our signatures in presence of two witnesses.

OSCAR HORNER.
WILLIAM H. WISE.

Witnesses:
W. M. COCHRAN,
W. C. PENTZ.